United States Patent [19]

Matsumoto

[11] Patent Number: 4,604,632
[45] Date of Patent: Aug. 5, 1986

[54] RECORDER TRANSPORT FOR PERFORATING AND CUTTING OPERATIONS

[75] Inventor: Hiroaki Matsumoto, Yokohama, Japan

[73] Assignee: Canon Kabushiki Kaisha, Tokyo, Japan

[21] Appl. No.: 520,577

[22] Filed: Aug. 5, 1983

[30] Foreign Application Priority Data

| Aug. 16, 1982 [JP] | Japan | 57-141016 |
| Aug. 16, 1982 [JP] | Japan | 57-141017 |
| Aug. 16, 1982 [JP] | Japan | 57-141018 |
| Aug. 16, 1982 [JP] | Japan | 57-141019 |

[51] Int. Cl.⁴ ............... G01D 15/28; H04N 1/31; B41J 3/04; B41F 1/08
[52] U.S. Cl. ............... 346/24; 346/136; 358/304; 400/621; 101/93.07
[58] Field of Search ............... 346/141, 78, 24, 136; 83/332, 508, 678, 276; 400/621, 24; 101/24, 93.07; 358/304

[56] References Cited

U.S. PATENT DOCUMENTS

| 3,306,149 | 2/1967 | John | 83/676 |
| 3,803,963 | 4/1974 | Hunt | 83/676 |
| 3,872,239 | 3/1975 | Nelson | 178/6 X |
| 3,978,752 | 9/1976 | Meaden et al. | 83/678 |
| 4,079,646 | 3/1978 | Morishita | 83/349 X |
| 4,142,214 | 2/1979 | Yamazaki et al. | 358/257 X |
| 4,310,859 | 1/1982 | Takahashi et al. | 358/304 |

FOREIGN PATENT DOCUMENTS 57-72883  5/1982  Japan ............... 400/621

OTHER PUBLICATIONS

Condensed Chemical Dictionary (CCD), G. Hawley, 9th Ed. pp. 690, 740.

Primary Examiner—Joseph W. Hartary
Assistant Examiner—Gerald E. Preston
Attorney, Agent, or Firm—Fitzpatrick, Cella, Harper & Scinto

[57] ABSTRACT

Perforations are formed at predetermined positions of a rolled record paper to facilitate cut out of the record paper at the predetermined positions. A perforating wheel for forming the perforations is made of a plurality of materials to enhance durability and reduce a cost. The positions of the perforations on the record paper are set at front and rear edges of a recorded image or at an area between recorded images so that the record paper is properly cut out.

5 Claims, 24 Drawing Figures

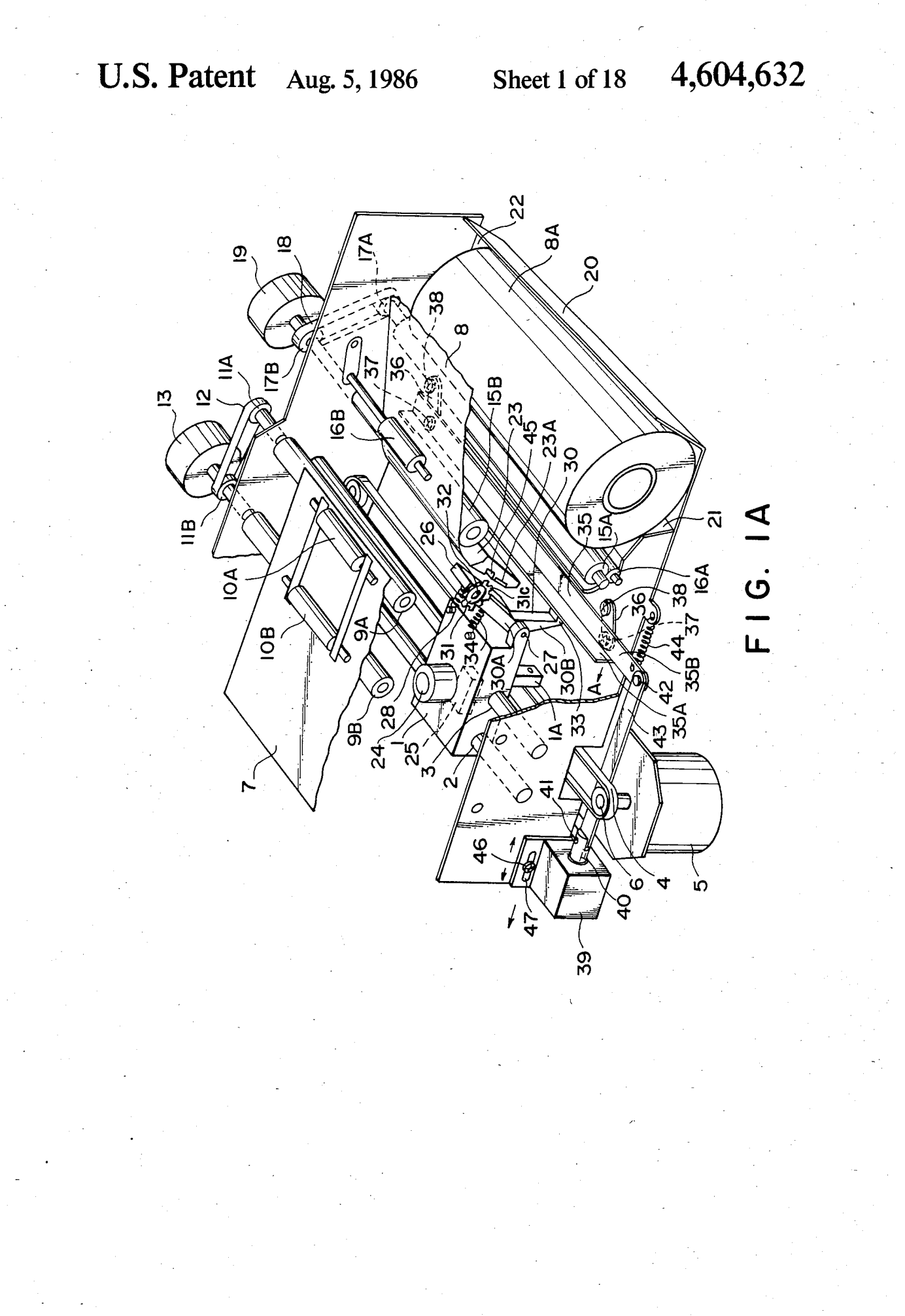

FIG. IA

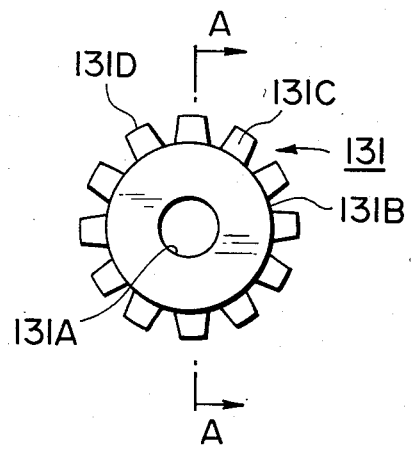 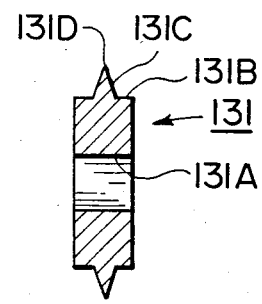
FIG. 2A
PRIOR ART
FIG. 2B
PRIOR ART
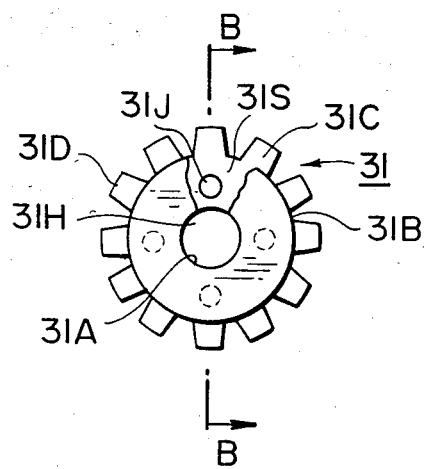 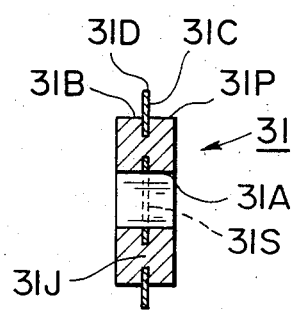
FIG. 3A  FIG. 3B

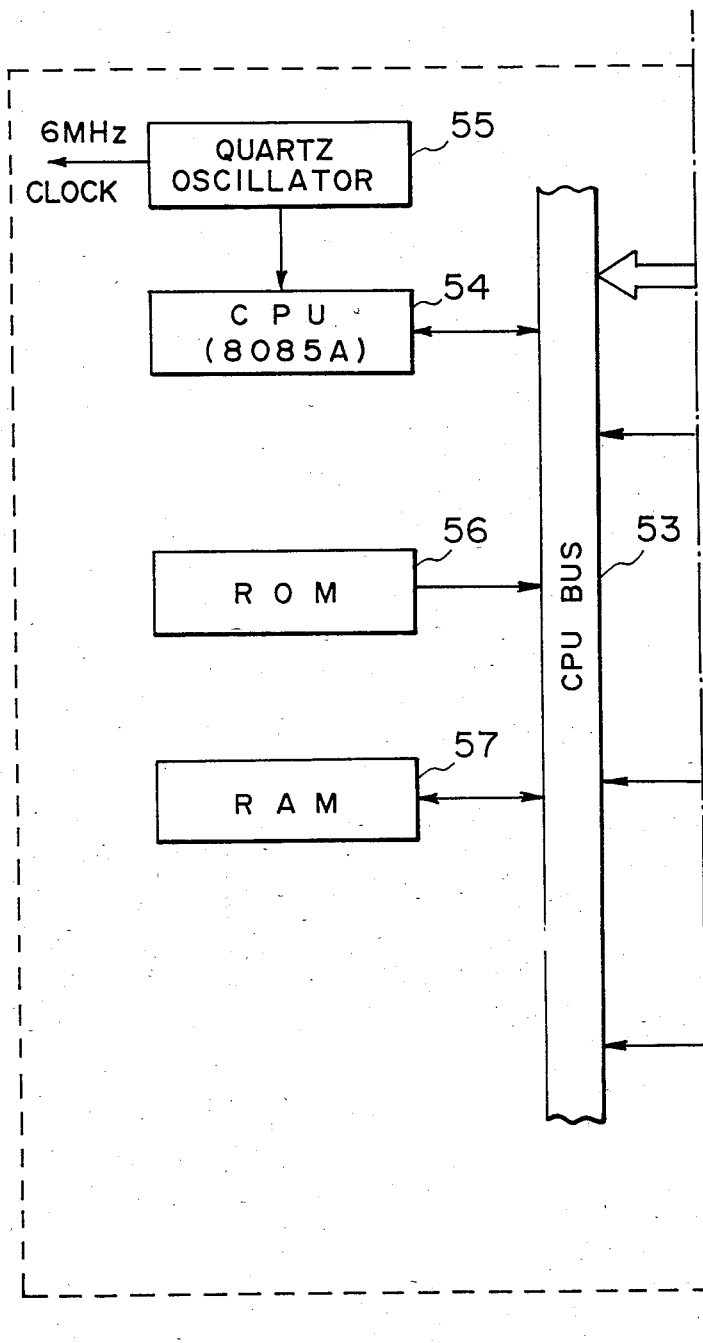
F I G. 7A

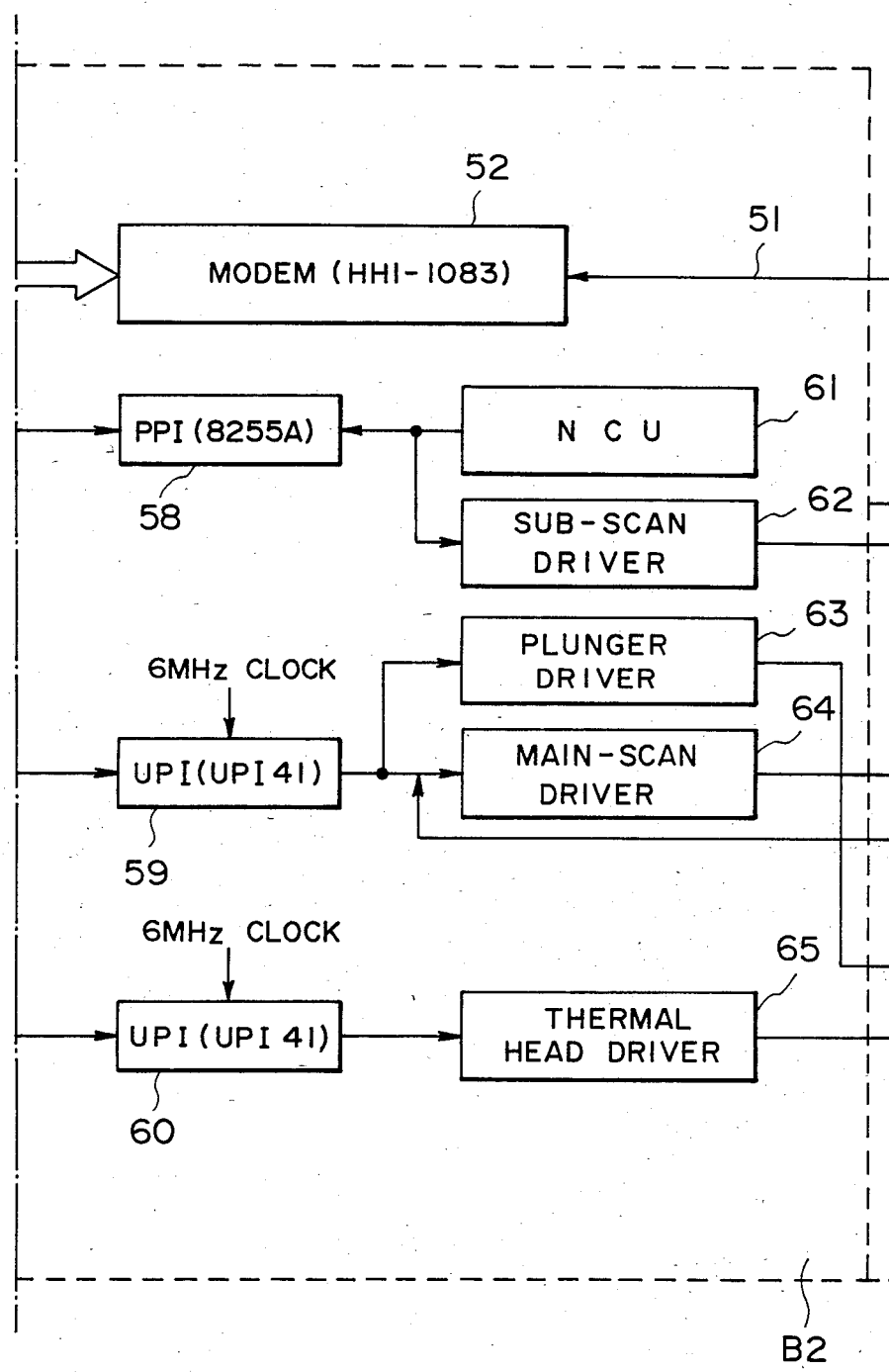
F I G. 7B

RECORDER TRANSPORT FOR PERFORATING AND CUTTING OPERATIONS

BACKGROUND OF THE INVENTION

1. Field of the Invention

The present invention relates to a perforating machine for forming perforations at predetermined positions of a rolled record paper.

2. Description of the Prior Art

In a recording apparatus such as a conventional facsimile machine, a rolled thermo-sensitive paper or insulative paper is used as a recording medium and recording is effected by a recording head which is reciprocally moved transversely to a direction of paper feed of the record paper.

In such an apparatus, the record paper is cut out each time when one picture of information has been recorded. In the prior art the record paper is cut out by a rotary blade, a shearing blade or a moving blade.

However, in such prior art cutting device, the form is damaged unless the blade is sharp and this causes a jam when the form is fed. As the number of time of cutting increases, the sharpness of the blade decreases and the blade must be exchanged. Thus, a lifetime of the blade is short. In cutting the form, a consideration has been paid to cut the form at a position as close to a record area by the recording means as possible in order to save the form yet, a space area remains at an edge of the form to be recorded. Thus, the form is wasted.

SUMMARY OF THE INVENTION

It is an object of the invention to form perforations at predetermined positions of a rolled record paper to facilitate cutting of the record paper.

It is another object of the present invention to provide a high durability and low cost perforating wheel to form perforations.

It is a further object of the present invention to form perforations in a record paper at proper positions related to recorded images.

BRIEF DESCRIPTION OF THE DRAWINGS

FIGS. 1(A) and 1(B) show a perspective view and a side elevational view including a partial sectional view taken in a direction of main scan, respectively, of one embodiment of a facsimile machine to which a recording apparatus of the present invention is applied, FIGS. 2(A) and 2(B) show a side elevational view and a sectional view taken along a line A—A, respectively, of one embodiment of a conventional perforating wheel in the prior art, FIGS. 3(A) and 3(B) shows a side elevational view, partly broken, and a sectional view taken along a line B—B, respectively, of one embodiment of a perforating wheel used in the recording apparatus of the present invention, FIGS. 7A, 7B, and 7C shows a block diagram of an overall control system.

DETAILED DESCRIPTION OF THE PREFERRED EMBODIMENTS

Figure 1B:
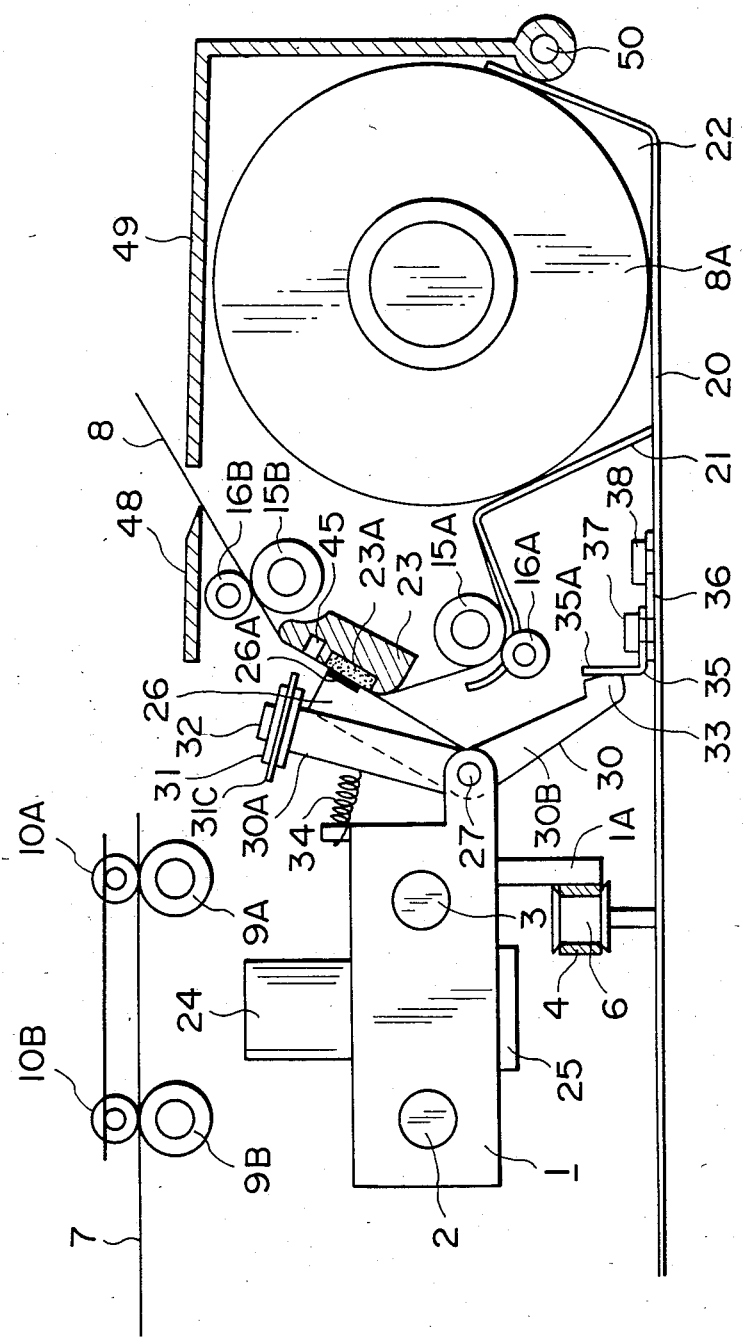

FIGS. 1(A) and 1(B) show an embodiment of a facsimile machine having a perforating machine in accordance with the present invention. Numeral 1 denotes a head mount slidably attached to parallel guide shafts 2 and 3, numeral 4 denoted a conveyer belt coupled to a coupler 1A of the head mount 1A to reciprocally move the head mount 1 in a direction of scan, and numeral 5 denotes a motor for driving the belt 4 through a pulley 6. The head mount 1 is reciprocally moved over a distance longer then a width of an original 7 or a record paper 8.

Numerals 9A and 10A, and 9B and 10B denote text feed rollers which are kept in contact at opposing positions, respectively. Clearances for reading a record are formed between the rollers 9A and 10A, and 9B and 10B, and those rollers are arranged along the direction of the movement of the head mount 1.

The rollers 9A and 9B are driven by a motor 13 through pulleys 11A and 11B, respectively, and a belt 12 spanned between the pulleys 11A and 11B, so that they sequentially move the original 7 at a pitch of read width.

Numerals 15A and 16A, and 15B and 16B denote paper feed rollers which are kept in contact at opposing positions, respectively, and arranged in parallel to the rollers 9A, 9B, 10A and 10B. The rollers 15A and 15B are driven by a motor 19 through pulleys 17A and 17B, respectively, and a belt 18.

The record paper 8 is fed from a paper roll 8A which is contained in a holder 22 formed by a base plate 20 of a main frame and a paper guide plate 21. The record paper 8 is held between the paper feed rolls 15A and 16A and fed to the upper paper feed rollers 15B and 16B while it is kept in contact with a surface of a platen 23. Numeral 23A denotes an elastic member such as rubber which extends over an entire width of the record paper 8 so that the record paper 8 keeps a good contact with the surface of the platen 23.

Reading means and recording means mounted on the head mount 1 are now explained. Numeral 24 denotes reading optical means and numeral 25 denotes a reading element which reads image information as the head mount 1 is scanned along a plane of the original 7. In a facsimile transmission mode, an electric signal derived from the reading element 25 is converted to a facsimile signal by modulating means, not shown.

Numeral 26 denotes a recording head rotatably mounted on the head mount 1 around a pin 27. A plurality of recording elements 26A are arranged at an end of the head 26 in a direction of sub-scan (see FIG. 1(B)). In a facsimile receiving mode, the recording elements 26A are urged to the record paper 8 by a constant pressure generated by a spring force of a spring 28. The recording devices may be thermo-sensitive elements, electrostatic recording elements or electric conduction recording elements.

A perforating mechanism which uses a perforating wheel of the present invention in the facsimile machine in now explained.

Numeral 30 denotes a perforating lever pivotably supported around a pin 27. A perforating wheel 31 is rotatably attached to a shaft 32 at an end of an upper arm 30A of the perforating lever 30, and an abutment 33 is formed at an end of a lower arm 30B. Numeral 34 denotes a spring spanned between the head mount 1 and the arm 30A. The abutment 33 of the arm 30B is normally kept in abutment to a side 35A is normally kept in abutment to a side 35A of a perforating wheel guide rail 35 by a spring force of the spring 34.

The guide rail 35 is coupled to two parallel link arms 36 through pins 37, and the arms 36 are pivotably mounted around fixed pins 38. The guide rail 35 is moved in parallel to the main scan direction by the link mechanism described above. Numeral 39 denotes an electromagnetic plunger for driving the guide rail 35. An armature 40 thereof and an extension 35B of the guide rail 35 are linked by a link lever 43 through pins 41 and 42. In a deenergized state of the electromagnetic plunger 39, the guide rail 35 is biased the paper roll 8A by a spring force of a spring 44 spanned between the extension 35B and the base plate 20.

Under this condition, when the rail 35 is rotated counterclockwise (see FIG. 1(A)) around the fixed pin 38, the perforating lever 30 is rotated counterclockwise aroung the pin 27 by the spring force of the spring 34 so that the perforating wheel 31 is kept away from the surface of the record paper 8. Numeral 45 denotes a perforating groove formed in the main scan direction in the surface of the platen 23. In a perforating operation to be described later, teeth 31C of the perforating wheel 31 go into the groove 45 to form the perforations in the record paper 8.

The electromagnetic plunger 39 is mounted on the base plate 20 by a fixed bolt 46. A mounting threaded hole 47 is of slot shape extending in a direction of stroke of the armature 40. When the electromagnetic plunger 39 is mounted and adjusted in position, it is finely moved in the direction of the slot 47 to adjust a home position and a perforation position of the guide rail 35 so that an impaction attitude of the perforating wheel 31 to the record paper 8 in the perforating operation is adjusted.

In FIG. 1(B), numeral 48 denotes a stationary cutter mounted on an outer case, not shown. When the record paper 8 is to be cut at a desired position, it is cut by an edge of the cutter 48. Numeral 49 denotes a record paper cover pivotably mounted on a shaft 50.

The structure of the perforating wheel is now explained.

FIGS. 2(A) and 2(B) show a conventional perforating wheel 131 in the prior art. A bearing 131A to which the shaft 32 is fitted, a flange 131B having an outer periphery thereof abutted to the surface of the platen 23 and teeth 131C are integrally formed.

The perforating wheel 131 may be formed by cutting and griding an integral material, but tooth edges 131D of the teeth 131C should not be too thin because of a strength of the material used and the bearing 131A cannot have a proper lubrication property. In addition, a cost is high because of machinning.

The present invention provides a perforating wheel which has a high durability, is inexpensive and affords a high efficiency perforating operation.

FIGS. 3(A) and 3(B) show the perforating wheel in accordance with the present invention. Numeral 31S denotes a thin steel plate having a thickness of 0.1–0.2 mm and having teeth 31C formed along an outer periphey thereof. A bearing hole 31H and coupling holes 31H are formed in the thin plate 31S by pressing.

Numeral 31P denotes a plastic member formed in union with the thin plate 31S, in which a bearing 31A and a flange 31B are formed. The plastic material may be high lubrication Derlin (polyacetal, tradename of Dupont Far East) in order to attain an excellent bearing property.

With the perforating wheel 31 thus constructed, the tooth edges 31D are sufficiently thin and sharp and have high durability. In addition, since the bearing 31A in formed by the plastic material having high lubrication property, an excellent lubrication is attained.

An attitude of the perforating wheel 31 during the operation is explained with reference to FIG. 4. The flange 31B of the perforating wheel 31 contacts to the surface of the platen 23 to prevent the raise of the record paper 8 and to prevent the tooth edges 31D of the perforating wheel 31 from contacting to the bottom of the groove 45. Thus, the platen with its groove 45 acts as a guide for the rotating perforating wheel 31.

The teeth 31C sequentially form the perforations in the record paper 8 at a pitch of the teeth 31C. Because the flange 31B rolls while it presses both sides of the perforations with an appropriate pressure, the perforations are formed at a right pitch.

The operation of the perforating mechanism in the facsimile machine is now explained.

When the facsimile machine is in the transmission mode, the transmission is effected by reading the original 7. Since the recording unit is not in operation, the perforating operation is not necessary. By energizing the motor 13, the original 7 is intermittently moved at the pitch of the predetermined read pitch while it is held between the feed rollers 9A and 10A, and 9B and 10B. The head mount 1 is moved in the main scan direction during the stop period of the original 7 so that a plural lines of image information are read by the reading elements 25 through the optical means 24. At the end of the read operation, the head mount 1 is returned and the original 7 is fed.

The electrical signal derived by photo-electrically converting the output signal of the reading element 25 is converted to the facsimile signal by modulation means, not shown, and it is transmitted to a receiver through a telephone line, if a wire system is used.

On the other hand, since the record unit does not require the paper feed and the recording during this period, the paper feed motor 19 is not energized and the recording head 26 is at the position away from the surface of the record paper 8, that is, the position shown in FIG. 1(A) by biasing means, not shown against the spring force of the spring 28. The plunger 39 is not energized but kept in the deenergized state. Accordingly, the guide rail 35 is biased toward the paper roll 8A by the spring force of the spring 44 and the arm 30A of the perforating lever 30 is pulled toward the head mount 1 by the spring force of the spring 34 so that the perforating wheel 31 is kept away from the surface of the paper on the platen 23.

When the facsimile machine is in the receiving mode, the reading operation for the original 7 is not carried out and the feed roller 13 is not driven and the means for inserting the original 7 into the read position is in rest. At the start of the receiving operation, the perforating operation is not necessary and the electromagnetic plunger 39 is not energized but kept in the deenergized state. Thus, the perforating wheel 31 is kept away from the surface of the record paper 8.

When the receiving operation is started, the recording head 26 is biased toward the platen 23 by the spring force of the spring 28 by the biasing means, not shown, and the motor 5 is energized and the recording head 26 is moved with the head mount 1 in the main scan direction to record a plural lines of image on the record paper 8.

At the end of one scan operation, the head 26 is again returned with the head mount 1 to the home position by the biasing means and the rollers 15A and 16A, and 15B and 16B are driven by the paper feed motor 19 so that the record paper 8 is fed by the predetermined pitch. Then, the next recording operation is repeated.

At the end of the received image, the end is detected and the electromagnetic plunger 39 is energized. Then, the perforating operation is carried out.

As the plunger 39 is energized, the armature 41 is attracted and the perforating wheel guide rail 35 is pulled out toward the head mount 1, that is, in the direction of an arrow A, through the link lever 43. As a result, the lower arm 30B of the perforating lever 30 is moved by the side 35A of the rail 35 through the abutment 33 so that the perforating lever 30 is pivoted clockwise as viewed in FIGS. 1(A) and 1(B) around the pin 27.

The perforating wheel 31 is thus pivoted with the upper arm 30A and the flange 31B (see FIGS. 3(A) and 3(B)) is abutted to the surface of the record paper 8 across the groove 45 of the platen 23 and the teeth 31C are fitted into the groove 31C.

Figure 4:
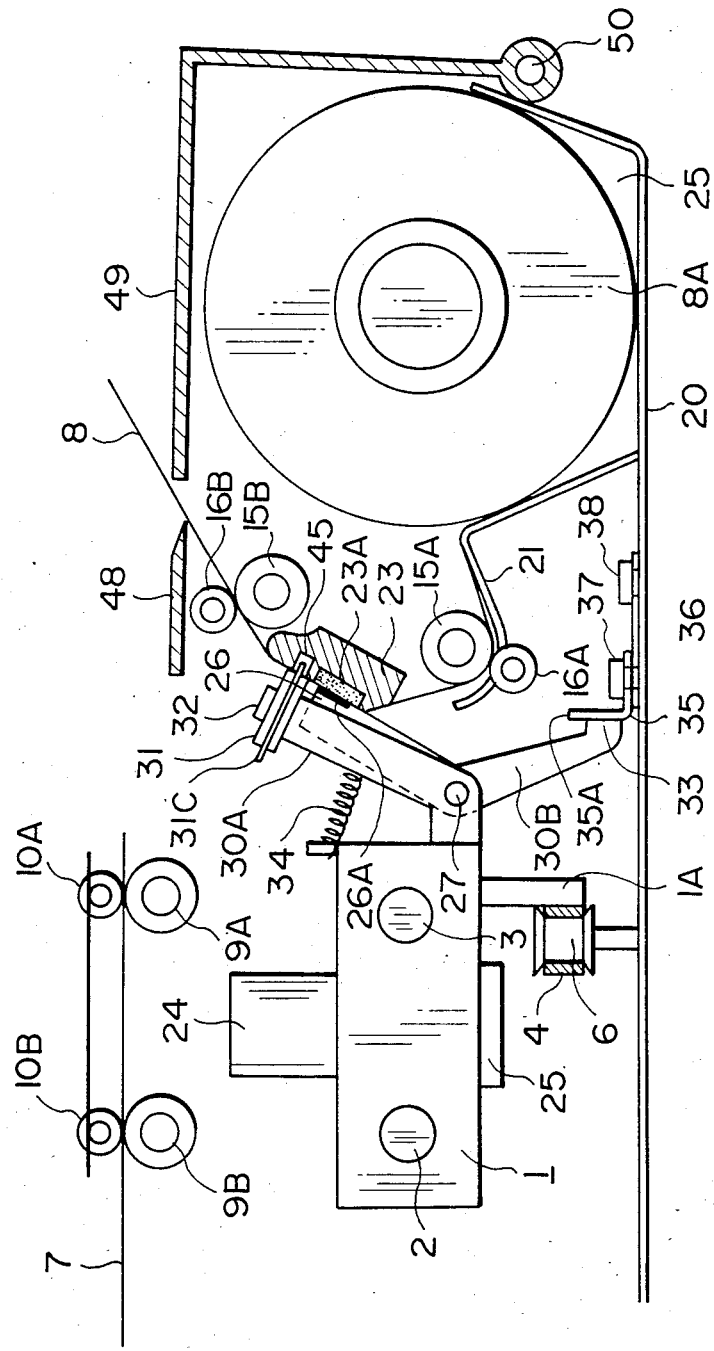
FIG. 4 shows a partial sectional view of the recording apparatus of the present invention and a perforating mechanism in a recording state and a perforating state.

FIG. 4 shows a position in which the perforating wheel 31 is set at the perforating position. While the record head 26 is shown at the record position or the position in contact with the record paper, no recording is effected because no recording current flows through the record head 26. In order to avoid the abrasion of the record head 26, the record head 26 may be kept away from the record paper.

As the perforating wheel 31 is set to the predetermined perforating position, the head mount 1 is moved forward or backward along the guide shafts 2 and 3 to pass over the entire width of the paper to rotate the perforating wheel 31 along the surface of the record paper. Thus, the perforations are formed at a constant interval near the end of the image area on the record paper 8 by the teeth 31C of the perforating wheel 31.

At the end of the movement of the head mount 1 for perforation, the plunger 39 is deenergized and the guide rail 35 is pulled down to the home position by the spring force of the spring 44 so that the perforating arm 30 and the perforating wheel 31 are moved away from the perforating position toward the head mount 1.

The adjustment operation of the adjusting mechanism of the perforating wheel 31 is now explained. The armature 40 of the electromagnetic plunger 39 has a constant stroke for excitation or deexcitation. In order to urge the flange 31B of the perforating wheel 31 to the record paper 8 through the guide rail 35 and the perforating lever 30 at a constant pressure, a certain adjusting mechanism is necessary.

In the present embodiment, as shown in FIG. 1(A), the slot 47 is formed in the direction of the stroke in the flange of the electromagnetic plunger 39 attached to the base plate 20. In mounting the plunger 39, the plunger 39 is finely moved back and forth in the direction of the slot 47 such that the predetermined pressure is applied to the flange 31B of the perforating wheel 31. After the adjustment, the fixing bolt 46 is tightened to keep the position. In addition to the adjusting mechanism of the present embodiment, the length of the link lever 43 may be variable or means for changing a relative position of the shaft 32 the perforating wheel 31 to the record paper may be provided.

As described hereinabove, according to the present invention, the perforating wheel is mounted on the head mount which carries the record head and is reciprocally mount so that the perforating wheel is set to the position at which it is in contact with the record paper or the position at which it is away from the record paper. When the perforating wheel is in the position to contact to the record paper, the perforating wheel is free to rotate in the direction of scan of the head. The cylindrical flange of the perforating wheel having the teeth thereon presses the surface of the platen through the record paper and the teeth of the perforating wheel fit into the groove formed in the direction of the scan in the surface of the platen. As the head mount is moved forward or backward, the perforating wheel is rolled along the platen to form the perforations. The perforating wheel is formed by the thin plate of the hard metal having the teeth on the periphery thereof and the portion from the flange to the bearing boss (made of plastic material) in one unit. The teeth are uniformly arranged circumferentially at the center of the width of the flange surface with the edges of the teeth being prevented from contacting to the bottom of the groove. Accordingly, the teeth are durable and the bearing and the flange surface are wear-resistive and inexpensive. The jam in the recording unit which occurred when the prior art cutting blade was used is prevented. The cutting perforations are formed in the record paper by the durable perforating wheel 31 in an efficient manner for each frame of information and the space area of the record paper 8 which has been required in the prior art cutting device is no longer necessary. Thus, the waste of the record paper is prevented.

Since the elastic member 23A such as rubber is attached to the head contact surface of the platen 23 over the entire width, the record paper 8 is always held by the uniform holding force by the elastic function of the elastic member 23A.

Figure 5:
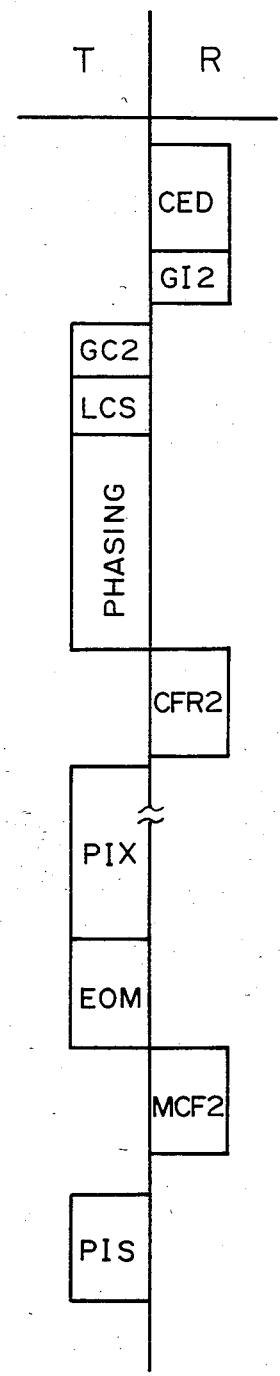
FIG. 5 is a timing chart for illustrating an example of transmission control protocol of the facsimile machine of FIGS. 1(A) and 1(B)

FIG. 5 shows an example of transmission control protocol of the facsimile machine of FIGS. 1(A) and 1(B) in accordance with the G2 standard recommended by the CCITT T-30 Recommendation. T denotes an image transmitting (calling) facsimile machine (hereinafter referred to as a transmitter) and R denotes an image receiving (called) facsimile machine (hereinafter referred to as a receiver).

Tranceivers (not shown) of the transmitter T and the receiver R are connected to a public telephone line and they are set to transmission/reception mode. When the receiver R transmits a CED signal (called station identifying signal) which is a tonal signal and a GI2 signal (group identifying signal), the transmitter T sends back a GC2 signal (group command signal), an LCS signal (line status signal) and a phasing signal. The receiver R synchronizes itself to the phasing signal and sends a CFR2 signal (ready for reception identifying signal). Then, the transmitter T sends a PRX signal (picture signal) to the receiver R and sends an EOM signal (end of message signal) at the end of transmission of each page of picture image. In response to the EOM signal, the receiver R sends back an MCF2 signal (message identifying signal) and sends the GI2 signal for receiving the next image. Then, the above procedures are repeated. At the end of the entire picture image, the transmitter T sends a PIS signal (stop of processing signal).

Figure 6A:
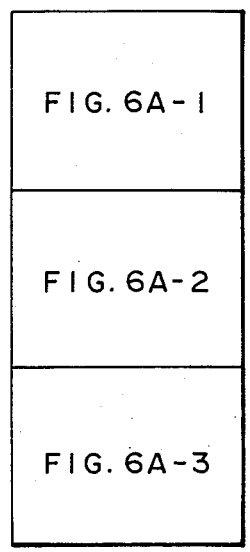
FIG. 6A shows an arrangement of FIGS. 6A-1, 6A-2, and 6A-3, FIGS. 6A-1, 6A-2, and 6A-3 are flow charts for illustrating an example of image receiving operation.

FIG. 6(A) is a flow chart illustrating a receiving operation of the facsimile machine of FIGS. 1(A) and 1(B) in accordance with the transmission control protocol of FIG. 5. Referring to FIG. 6(A), the timing of the perforating operation of the facsimile machine incorporating the present invention is explained.

The receiver (image receiving facsimile machine) R starts the operation when a reception button (not shown) of the tranceiver is depressed, and sends the CED signal (called station identifying signal) (step S1) and the GI2 signal (group identifying signal) (step S2) from the tranceiver controlled by a microprocessor (not shown), in accordance with a predetermined procedure. Then, the receiver R detects the GC2 signal (group identifying signal) sent from the transmitter (image transmitting facsimile machine) T (step S3) and synchronizes itself in accordance with the phasing signal sent from the transmitter T (step S5), and after the synchronization step (step S6), the receiver R sends the CFR2 signal (ready for reception identifying signal) to terminate the preparation for receiving the image signal (step S7).

After the transmission of the CFR2 signal and immediately before the reception of the image signal, the perforating wheel (perforating cutter) 13 is driven to form the perforations in the record paper 8 (step S8). Because the perforations are formed in the record paper 8 prior to the recording of the received image, it can be used as a mark to subsequently cut out a space area which exists between the cutter 48 and the record head 28 and the perforations can be formed in the record paper 8 at each space between the received images which paper 8 is exchanged, the perforations are formed at a space area in a leading edge.

If the perforating operation is carried out before the reception of the image signal but not immediately before the reception of the image signal, for example, around the transmission of the CED signal immediately after the start of the receiving operation, an error operation occurs if the GC2 signal is not detected such as when an automatic receiving operation is started by a wrong telephone call or the synchronization is failed, and the operation is ended (steps S4 and S6). If the operation is then resumed from the initial receiving operaion, the perforations are formed at the same position of the record paper 8 and the record paper 8 may be broken. In the present embodiment, since the perforations are formed immediately after the reception of the image signal, the above disadvantage is avoided and the perforations are formed only after the image has been recorded.

After the perforating operation, the receiver R receivers the PIX signal (picture image signal) sent from the transmitter T and reproduces the image on the record paper 8 in synchronism with the synchronizing signal (steps S9 and S10). When the image in reproduced by the record head 26 which is mounted on the reciprocating head mount (carriage) 1 and has 16 record elements arranged in the sub-scan direction, the reciprocating carriage 1 is moved one step in the main scan direction each time when 16 main scan lines of image signals are received, and the record paper 8 is bed in the sub-scan direction by a distance corresponding to 16 lines. For an size A4 original 7, it is divided into 1143 main scan lines and the reciprocating carriage 1 scans 72 times.

At the end of the transmission of the image of the first original 7, the transmitter T sends the EOM signal (end of message signal). By receiving the EOM signal (2100 Hz, three seconds), the receiver R detects the end of transmission of the image signal of one original. When the receiver R is continuously receiving the image signals of a plurality of originals 7, the receiver 7 detects the boarder of the originals by detecting the EOM signal (step S11). Thus, the receiver R feeds the record paper 8 by the predetermined amount after the last scan line has been recorded and sends the MCF2 singal (message identifying signal) indicating the completion of the reception of the image signal to the transmitter T (step S12).

If the PIS signal is not thereafter sent from the transmitter T in the predetermined period (step S13), the receiver R sends the GI2 signal (step S14), and if the PIS signal is not detected (step S15), the first step S2 is repeated to send the signal GI2. If the original 7 to be continuously transmitted is still set in the transmitter T, the transmitter T sends the GC2 signal and the receiver R detects the GC2 signal (step S3) and repeats the operation starting from the synchronization (step S5).

When the last original has been transmitted from the transmitter T, the transmitter T sends the PIS signal (stop of processing signal) in response to the MCF2 signal from the receiver R. The PIS signal may be sent immediately after the GI2 signal has been sent in the step S14. When the receiver R detects the PIS signal, it detects the completion of the reception of the image signal (steps S13 and S15). Even if the GI2 signal is repeatedly sent for 30 seconds at a time in the step S2, the transmitter T may not send the GC2 signal (steps S3 and S4). In this case, the receiver R determines that the image signal is not transmitted or a series of receiving operation have been completed. Thus, the receiver R terminates the operation when it detects the PIS signal in the step S13 or S15 or the affirmative decision in the step S4.

On the other hand, if an error occurs during the synchronization (step S6), or an error occurs during the reception of the image signal (step S11), an error processing is carried out. For example, the recorded area of the record paper 8 thus for recorded is ejected.

As described hereinabove, according to the present invention, since the perforations are formed prior to the recording of the received image signal, the perforation line can be used as a mark to cut out the space area which exists between the cutter and the record head, and the perforations can be formed in the record paper in the spaces between the received images. In addition, the record paper can be readily exchanged and the double perforation is prevented.

Figure 6B:
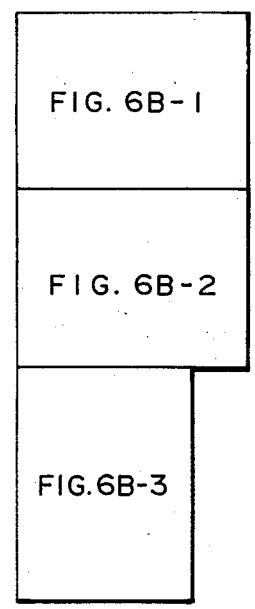
FIG. 6B shows an arrangement of FIGS. 6B-1, 6B-2, and 6B-3, FIGS. 6B-1, 6B-2, and 6B-3 are flow charts for illustrating an example of image receiving operation.

FIG. 6(B) is a flow chart illustrating a receiving operation of the facsimile machine of FIGS. 1(A) and 1(B) in accordance with the transmission control protocol of FIG. 5. Referring to FIG. 6(B), the timing of the perforating operation of the facsimile machine incorporating the present invention is explained.

The receiver R starts the operation when a reception button (not shown) of the tranceiver is depressed. The receiver R clears a record flag F which indicates the presence or absence of recorded image (step S1), sends the CED signal from the tranceiver controlled by a microprocessor (not shown) in accordance with a predetermined procedure (step S2), and sends the GI2 signal (step S3). Then, the receiver R detects the GC2 signal sent from the transmitter T (step S4).

If the original 7 to be transmitted is not set in the transmitter T, the GC2 signal is not sent. Thus, if the receiver R does not detect the GC2 signal after the repetitive transmission of the GI2 signal for a predetermined period, for example, 30 seconds (step S5), the receiver R terminates the receiving operation after it has checked that the record flag is not "1" (step S6).

On the other hand, if the transmitter T is ready for transmitting the image signal, it sends the GC2 signal. When the receiver R detects the GC2 signal, it checks if the record flag F is "1" in a step S7, and if it is not "1", it determines that the first image recording has not yet effected and inhibits the perforating operation of a step S8, synchronizes itself to the phasing signal subsequently sent (step S9), and after the synchronization (step S10), the receiver R sends the CFR2 signal to inform that it is ready for the reception of the image signal (step S11).

Thereafter, the receiver R receives the PIX signal transmitted from the transmitter T and reproduces the image on the record paper 8 in synchronism with the synchronizing signal (steps S12 and S13). When the image is reproduced by the record head 26 which is mounted on the reciprocating head mount (carriage) 1 and has 16 recording elements arranged in the sub-scan direction, the reciprocating carriage 1 is moved by one step in the main scan direction each time when 16 main scan lines of image signals are received, and the record paper 8 is fed in the sub-scan direction by a distance corresponding to 16 lines. For a size A4 original 7, it is divided into 1143 lines and the reciprocating carriage 1 is scanned 72 times.

At the end of the transmission of the first original, the transmitter T sends the EOM signal and the receiver R detects the end of the transmission of the image signal of one original by detecting the EOM signal (2100 Hz, three seconds). When the image signals of a plurality of originals 7 are to be continuously transmitted, the receiver R detects the boarder of the originals by detecting the EOM signal (step S14). Thus, the receiver R feeds the record paper 8 by the predetermined amount after the last scan line has been recorded, sends the MCF2 signal indicating the completion of the reception of the image signal to the transmitter T (step S15) and sets the record flag F to indicate the recording of the image signal (step S16). If the PIS signal is not thereafter sent from the transmitter T within the predetermined period (step S17), the receiver R sends the GI2 signal (step S18) and if it does not detect the PIS signal (step S19), the receiver R repeats the first step S3 to send the GI2 signal.

If the originals 7 to be continuously transmitted are still in the transmitter T, the transmitter T sends the GC2 signal and the receiver R detects the GC2 signal in the step S4 and repeats the operation starting from the synchronization step (step S9). Since the record flag F has been set to "1" in the previous step S16, the decision in the step S7 is affirmative and the perforating operation in the step S8 is carried out to drive the perforating wheel (cutter) 13 to form the perforations in the space area between the images on the record paper 8.

If the perforating operation is carried out immediately after the reception of the EOM signal, the end of the recorded area on the record paper 8 on which the image has thus far recorded by the end of the receiving operation is fed to the position of the cutter 48 and the record paper is cut out by the cutter 48. The amount of feed is a predetermined amount which varies depending on mechanical tolerance. Thus, there is a slight difference between the perforation position (perforation line) corresponding to the end of the recorded image after the paper feed and the position of the cutter 48 and hence the paper is not cut out at the same position.

In the present embodiment, the perforating operation is carried out after the detection of the start of transmission signal (GC2 signal) for the next image signal which is sent after the detection of the EOM signal for the previous image signal. Accordingly, the perforations are not formed at the end of the last received image and hence the above disadvantage is resolved. The record paper can be cut out by the cutter 48 without such perforation. Since the synchronization period in the step S9 is approximately six seconds, the perforating operation in the step S8 can be carried out within this period.

When the transmitter T has transmitted the last original, it sends the PIS signal in response to the MCF2 signal from the receiver R. The PIS signal may be transmitted immediately after the transmission of the GI2 signal in the step S18. The receiver R detects the end of the reception of the image signal by detecting the PIS signal (steps S17 and S19). Even if the GI2 signal is repeatedly sent for 30 seconds in the step S3 after the reception of the image signal, the transmitter T may not send the GC2 signal (steps S4 and S5). In this case, the receiver R determines the end of a series of receiving operations. Since the record flag F is "1" because the image signal has been received in the step S12, the decision in the step S16 is affirmative.

Thus, the receiver R goes to the step 20 when it detects the PIS signal in the step S17 or S19 or the record flag F is "1" in the step S6, and feeds the record paper 8 by the predetermined amount so that the space area after the last received image is registered with the position of the cutter 48 arranged near the ejection port of the record paper 8. Then, in the step S21, the perforating wheel 13 is driven again to form the perforations in the record paper 8. The perforations now formed correspond to the upper end position of the image area to be next received and it is used as a mark to cut out the space area at the upper end of the image to be next received.

If the decision in the step S5 is affirmative before the image has not been received yet, it indicates that the image is not transmitted, and the decision in the step S6 is negative and the operation is terminated. On the other hand, if an error occurs during the synchronization step (step S9), the decision in the step S10 is negative, and if an error occurs during the reception of the image signal in the step S12, the decision in the step S14 is negative. In those cases, an error processing is carried out. For example, the perforating wheel 13 is driven to form the perforations after the recorded area of the record paper 8 has been ejected, as is done in the steps S20 and S21.

As described hereinabove, according to the present invention, the space areas between the plurality of images continuously transmitted are detected and the perforations are formed in the space areas by the perforating wheel. In response to the detection of the end of reception of the image signal, the space area after the end of the last received image area is fed to the position of the cutter arranged near the ejection port of the record paper and the perforating wheel is driven again to form the perforations. Accordingly, the perforations are formed for each space area between the plurality of continuously received images and the perforations which function as the mark to cut out the leading edge of the first received image are also formed.

In accordance with a further feature of the present invention, the space area between the images is detected by detecting the start of transmission signal for the next image which is sent after the detection of the end of message signal for the previous image, and when such a space area is detected, the perforating wheel is driven to form the perforations. Accordingly, the cutout of the end of the last recorded image by the cutter is facilitated.

Figure 6C:
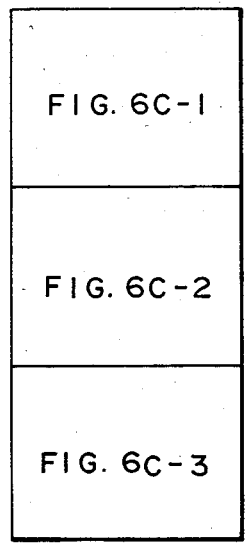
FIG. 6C shows an arrangement of FIGS. 6C-1, 6C-2, and 6C-3, FIGS. 6C-1, 6C-2, and 6C-3 are flow charts for illustrating an example of image receiving operation.
Figures 1, 6A:
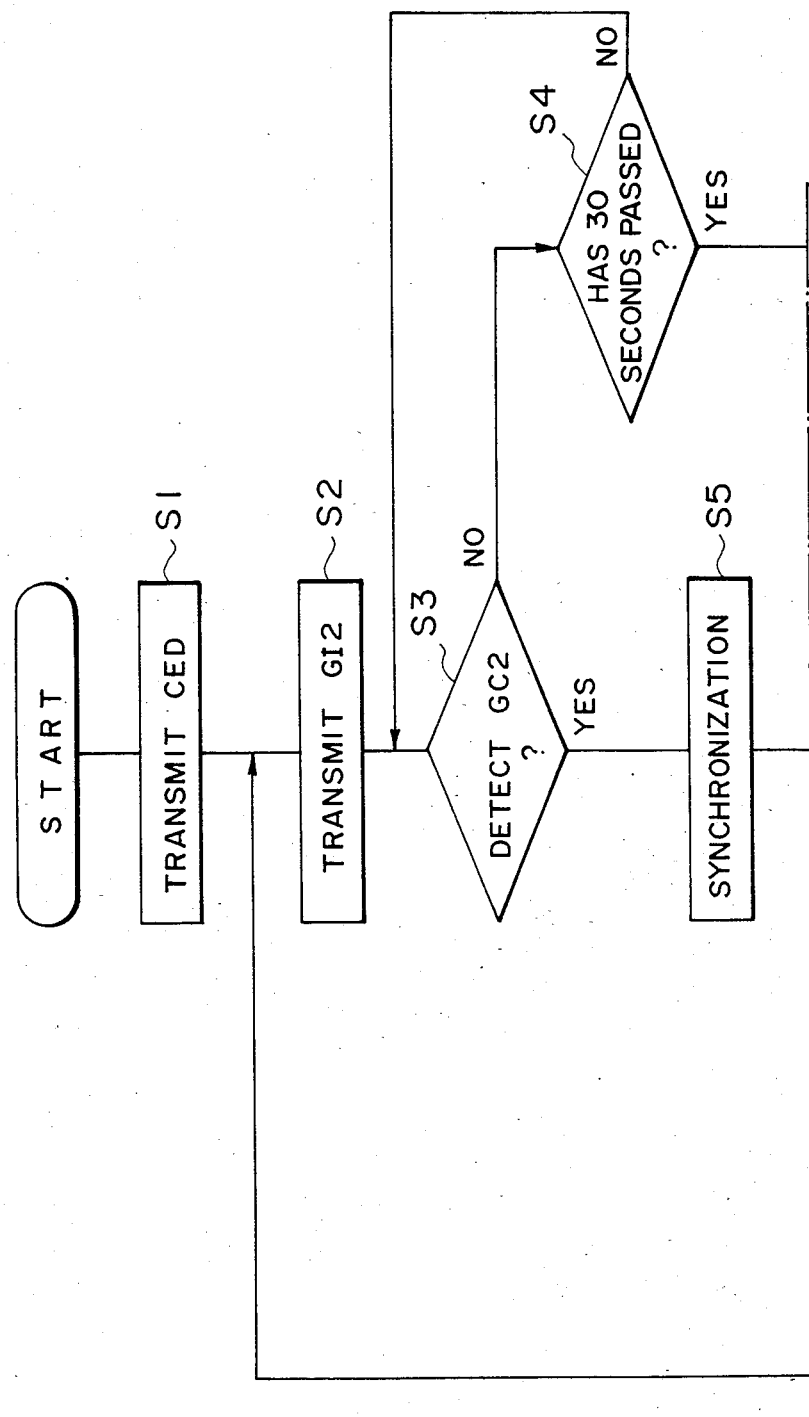
Figures 2, 6A:
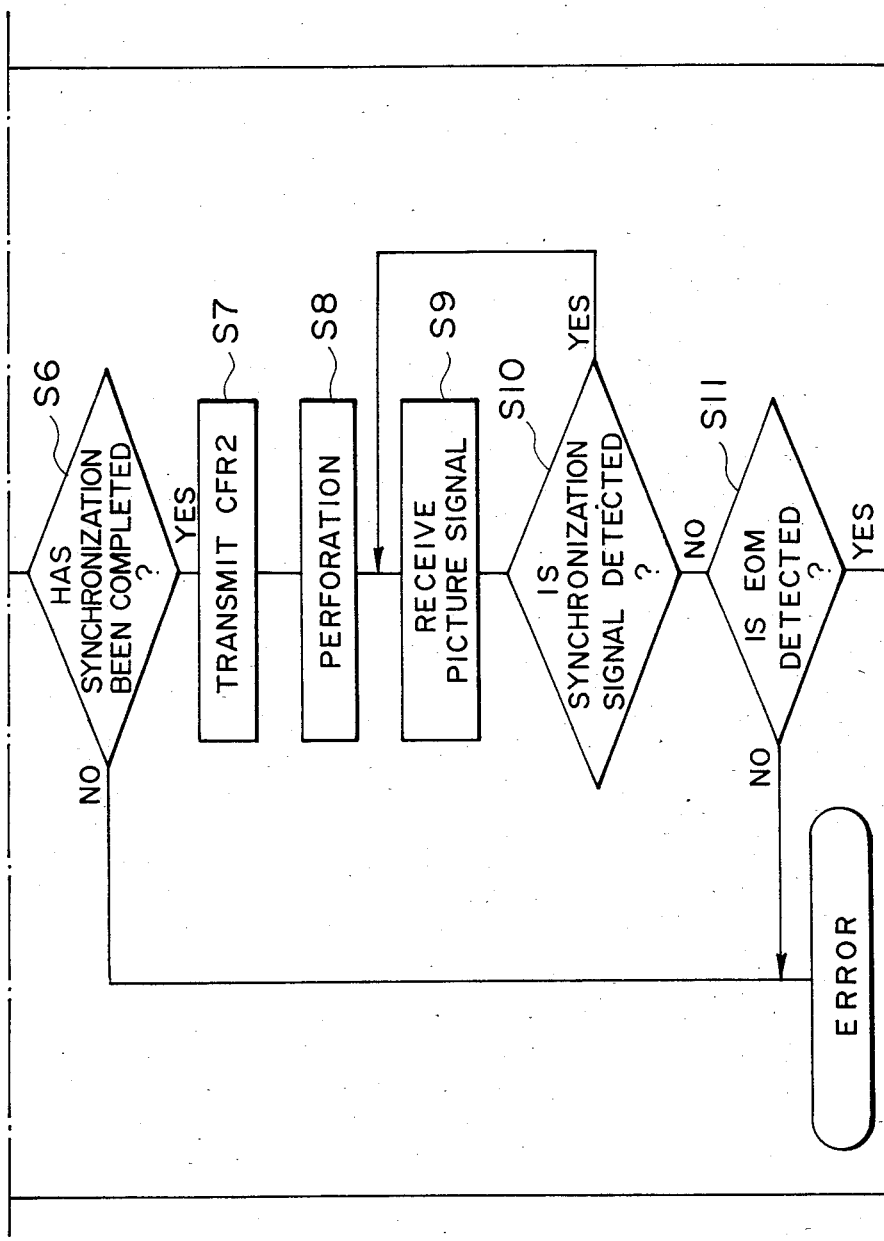
Figures 3, 6A:
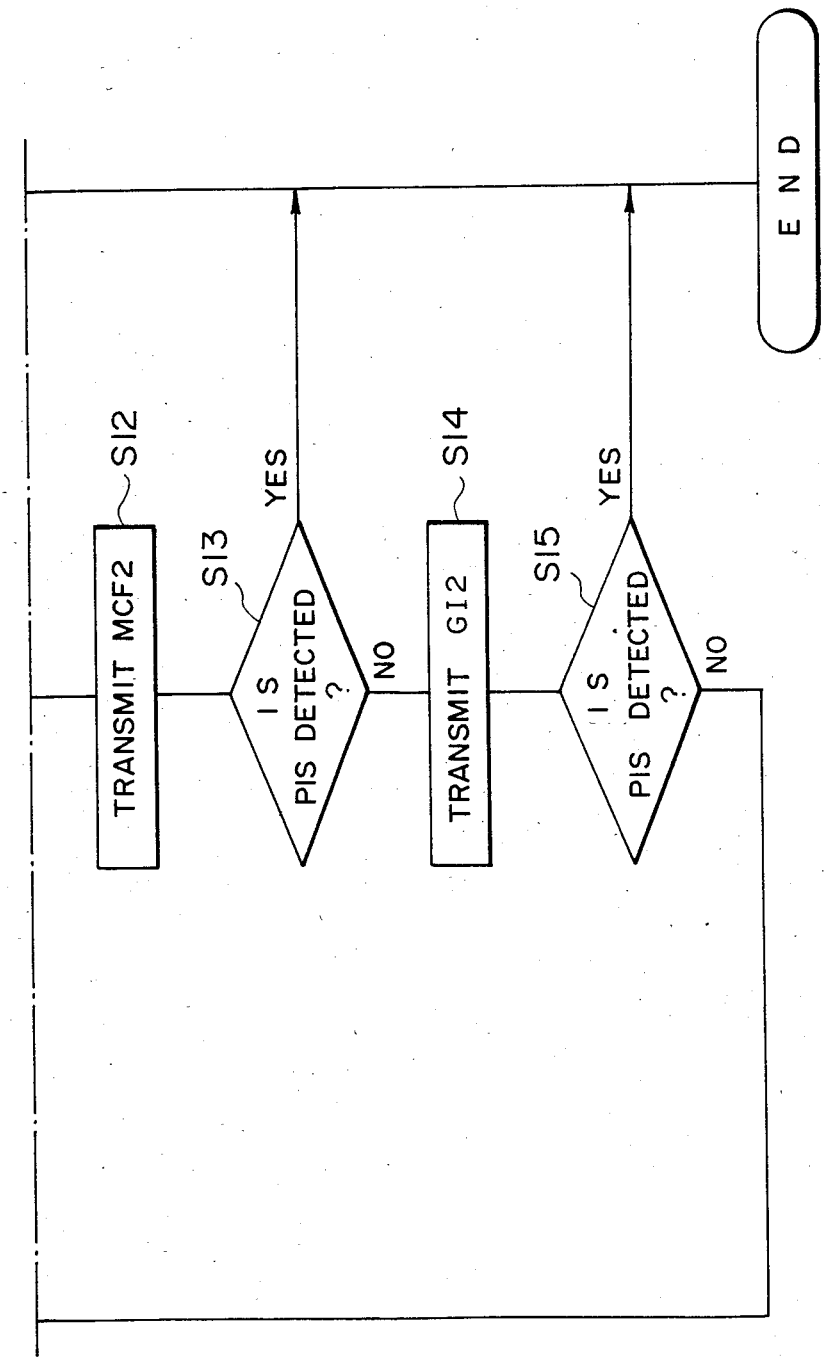
Figures 1, 6B:
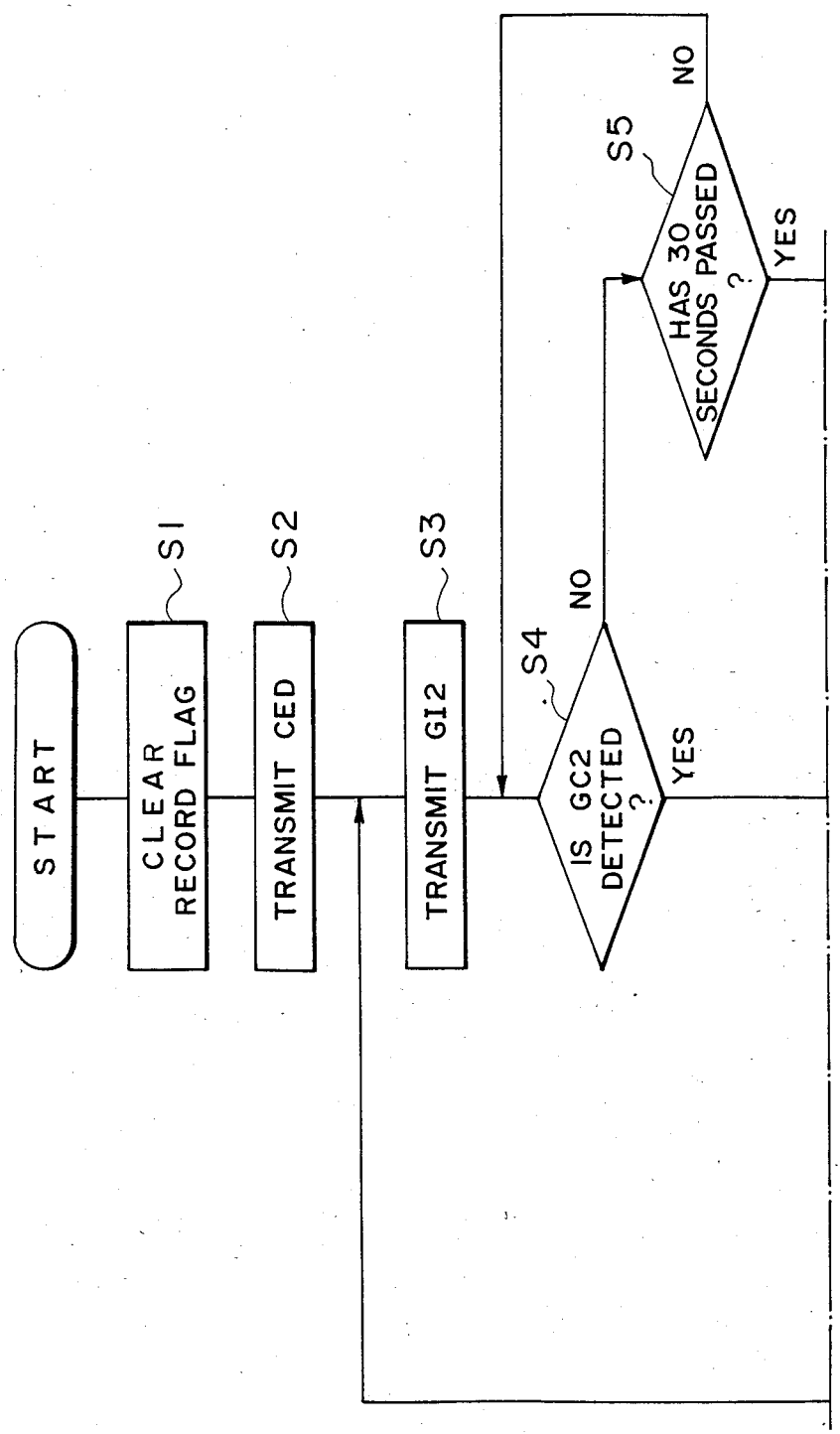
Figures 2, 6B:
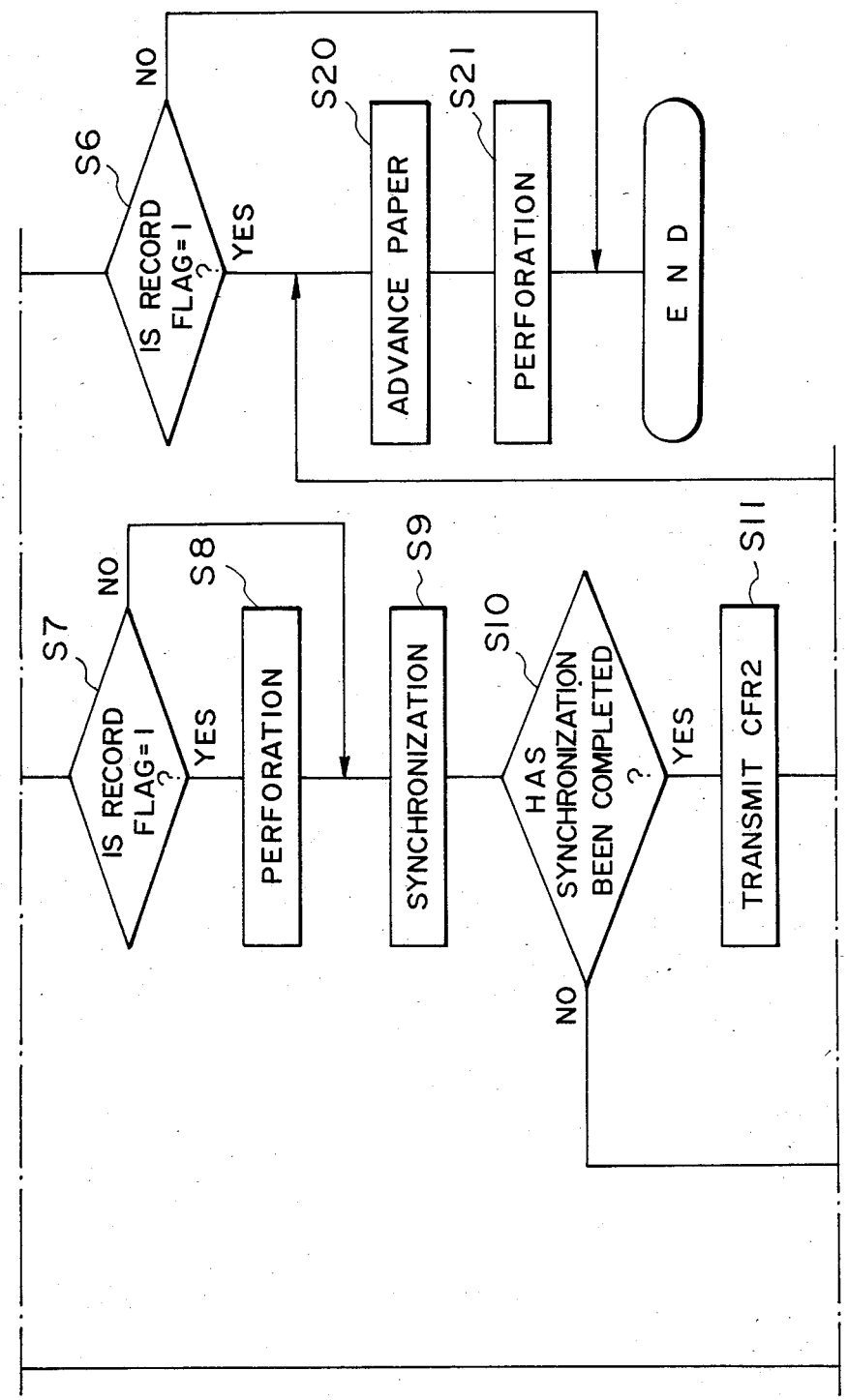
Figures 3, 6B:
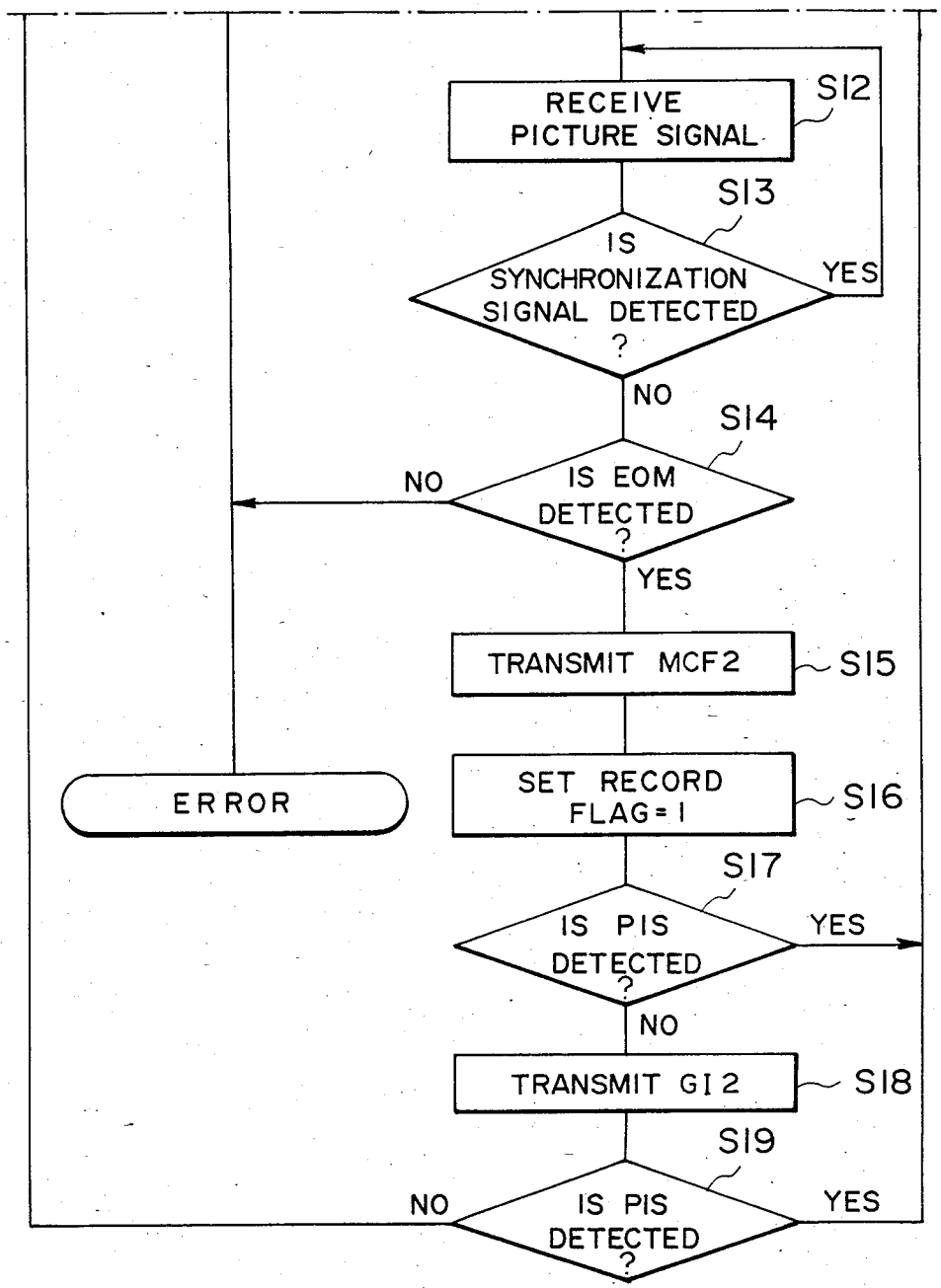
Figures 1, 6C:
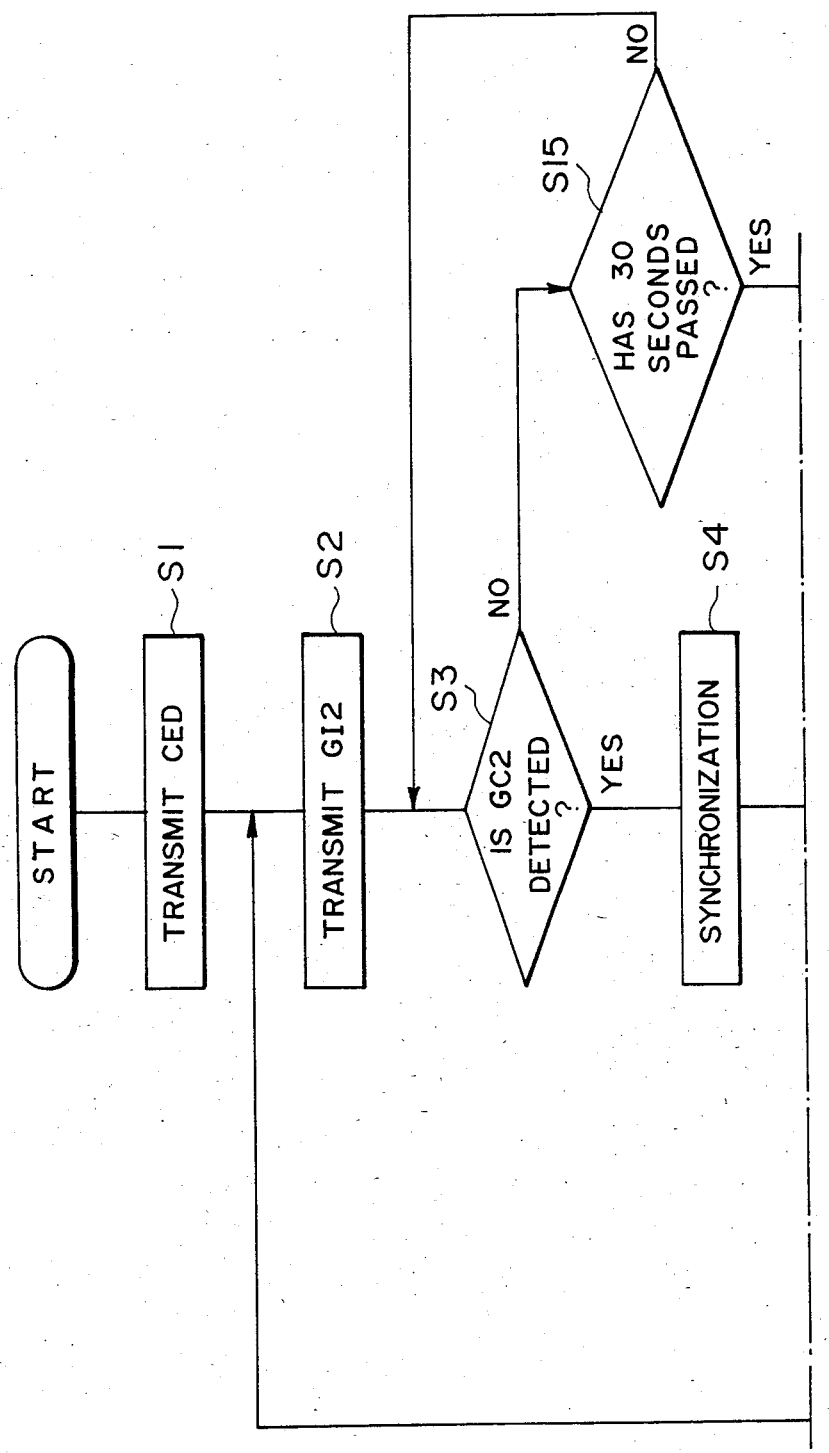
Figures 2, 6C:
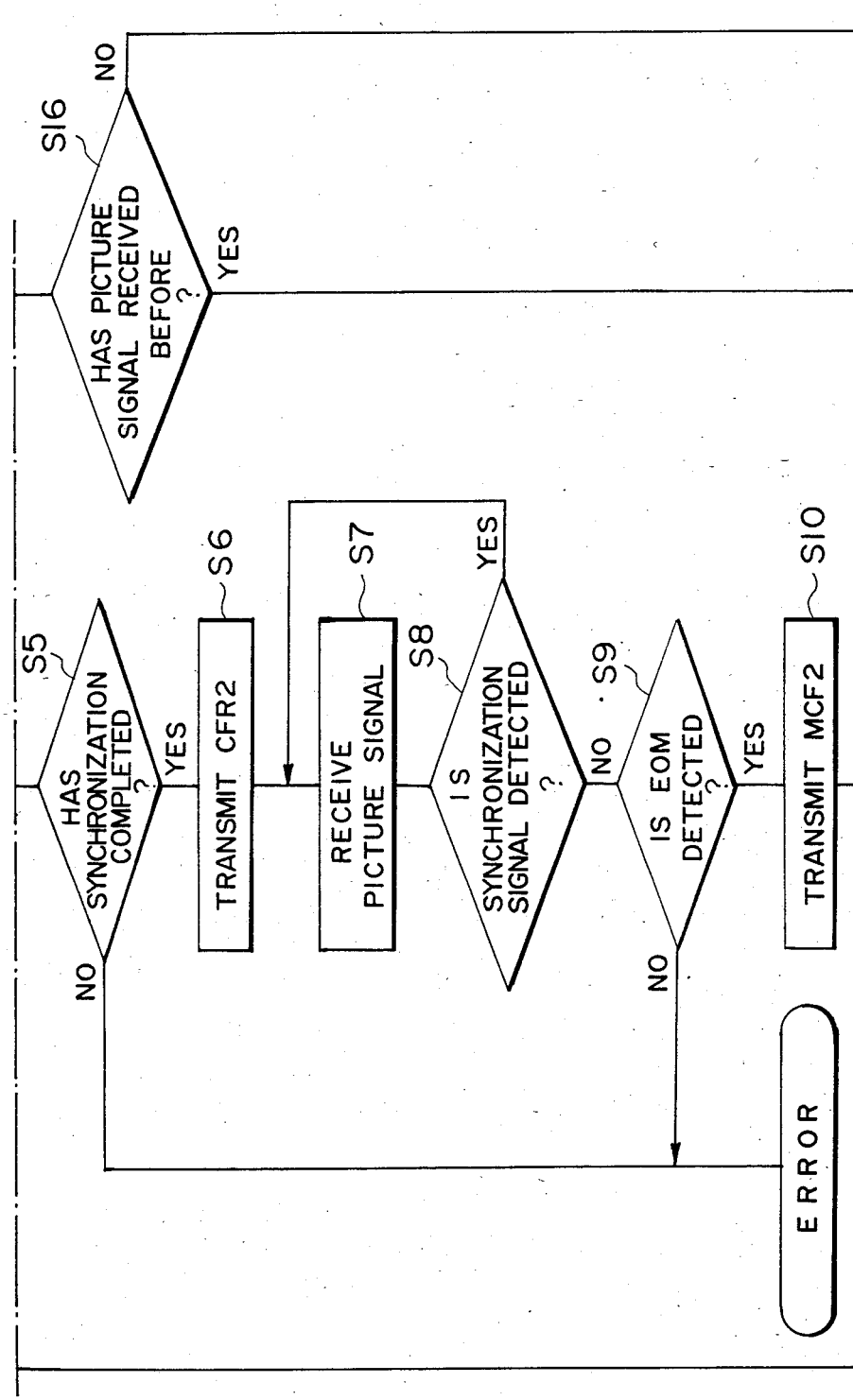
Figures 3, 6C:
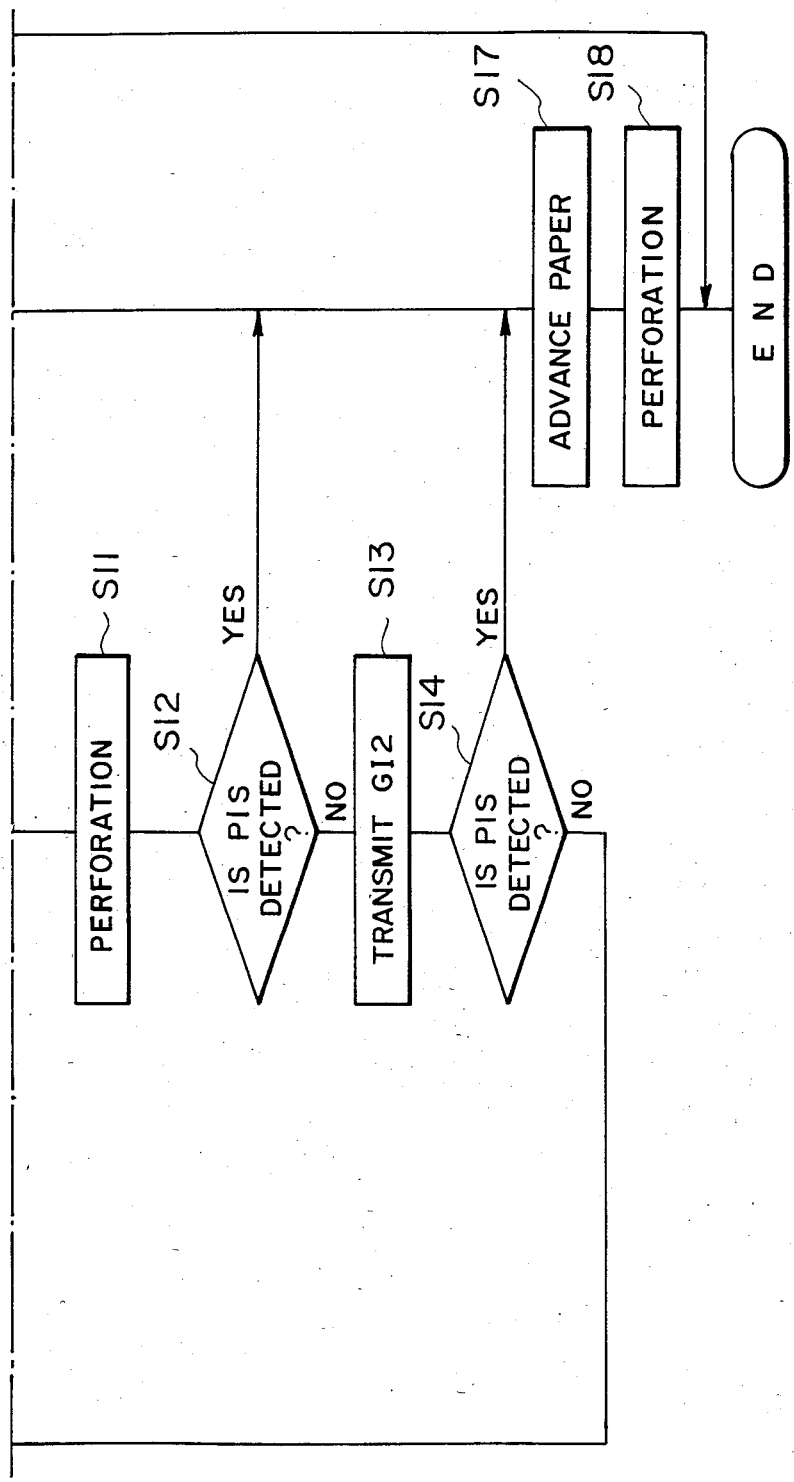
Figure 7C:
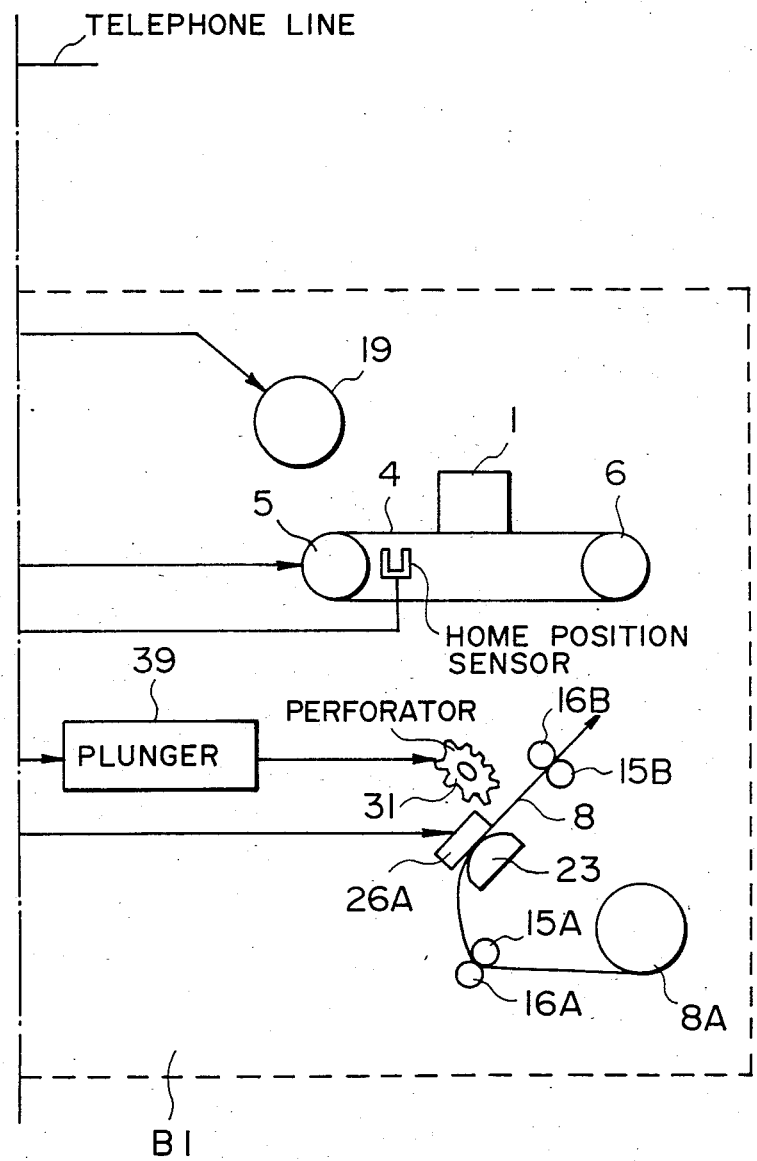

FIG. 6(C) is a flow chart illustrating a receiving operation of the facsimile machine of FIGS. 1(A) and 1(B) in accordance with the transmission control protocol of FIG. 5. Referring to FIG. 6(C), the timing of the perforating operation of the facsimile machine incorporating the present invention is explained.

The receiver R starts the operation when a reception button (not shown) of the transceiver is depressed, and sends the CED signal (step S1) and the GI2 signal (step S2) from the tranceiver controlled by a microprocessor (not shown), in accordance with a predetermined procedure. The receiver R then detects the GC2 signal sent from the transmitter T (step S3), synchronizes itself with the phasing signal sent from the transmitter T (step S4), and at the end of the synchronization (step S5), it sends the CFR2 signal to indicate the completion of the preparation for the reception of the image signal (step S6).

Thereafter, the receiver R receives the PIX signal sent from the transmitter T and reproduces the image on the record paper 8 in synchronism with the synchronizing signal (steps S7 and S8). When the image is reproduced by the record head 26 which is mounted on the reciprocating head mount (carriage) 1 and has 16 recording elements arranged in the sub-scan direction, the reciprocating carriage 1 is moved by one step each time when 16 main scan lines of image signals are received, and the record paper 8 is fed in the sub-scan direction by a distance corresponding to 16 lines. For a size A4 original 7, it is divided into 1143 lines and the reciprocating carriage 1 is scanned 72 times.

At the end of the transmission of the first original, the transmitter T sends the EOM signal. The receiver R detects the end of the transmission of one original of image signal by detecting the EOM signal (2100 Hz, three seconds). When the image signals of a plurality of originals 7 are to be continuously received, the boarder of the images is detected by detecting the EOM signal (step S9). The receiver R thus feeds the record paper 8 by the predetermined amount after the last scan line has been recorded, and then drives the perforating wheel (cutter) 13 to form the perforations (step S11).

In response to the reception of the EOM signal, the receiver R sends the MCF2 signal indicating the end of the reception of the image signal to the transmitter T (step S10). If the PIS signal is not thereafter sent from the transmitter T within the predetermined period (step S12), the receiver R sends the GI2 signal (step S13), and if the PIS signal is not detected (step S14), the receiver R repeats the first step S2 to send the GI2 signal. If the originals 7 to be continuously transmitted are still in the transmitter T, the transmitter T sends the GC2 signal and the receiver R detects the GC2 signal in the step S3 and repeats the operation starting from the synchronization step (step S4).

At the end of the transmission of the last original from the transmitter T, the transmitter T sends the PIS signal in response to the MCF2 signal from the receiver R. The PIS signal may be sent immediately after the transmission of the GI2 signal in the step S13. The receiver R detects the end of the reception of the image signal by detecting the PIS signal (steps S12 and S14). Even if the GI2 signal is repeatedly sent for 30 seconds in the step S2 after the reception of the image signal, the GC2 signal may not be sent from the transmitter T (steps S3 and S15). In this case, the receiver R determines the end of a series of receiving operations. Since the image signal has been received in the step S7, the decision in the step S16 is affirmative.

Thus, the receiver R goes to the step S17 when it detects the PIS signal in the step S12 or S14 or the decision in the step S16 is affirmative, and responds to the EOM signal to feed the record paper 8 until the perforation line formed in the record paper 8 is registered with the cutter 48 arranged near the ejection port of the record paper 8. Then, in the step S18, the receiver R drives the perforating wheel 13 again to form the perforations in the record paper 8. The perforations now formed correspond to the upper end of the image area to be next received and function as a mark to cut out the space area at the upper end of the image area to be next received.

If the decision in the step S15 is affirmative before the image signal has not yet been received, it indicates that the image signal is not transmitted and the operation is terminated. On the other hand, if an error occurs during the synchronization in the step S4, the decision in the step S5 is negative, and if an error occurs during the reception of the image signal in the step S7, the decision in the step S9 is negative. In those cases, an error processing is carried out. For example, the perforating wheel 13 is driven to form the perforations after the recorded area of the record paper 8 has been ejected, as is done in the steps S17 and S18.

As described hereinabove, according to the present invention, the space areas between the plurality of received images continuously transmitted are detected and the perforations are formed in the rolled record paper in accordance with the detected space areas. After the end of the reception of the series of image signals has been detected, the perforations are formed in the space area after the received image and the record paper is fed until the perforation line is registered with the cutter arranged near the ejection port of the record paper and the perforations are formed again in the record paper. Thus, the perforations are formed for each space between the received images which are continuously transmitted and the perforations which function as the mark to cut out the leading edge of the first received image are also formed.

Figure 7:
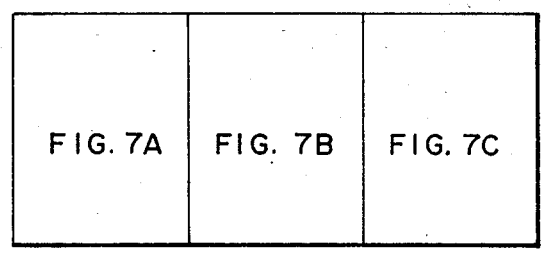
FIG. 7 shows an arrangement of FIGS. 7A, 7B, and 7C.

FIG. 7 is a block diagram of a control system for the perforating machine of the present invention.

In FIG. 7, a broken line block B1 corresponds to the mechanisms shown in FIGS. 1(A), 1(B) - 4, and the like elements are designated by the like numerals. A broken line block B2 shows an electrical circuit for effecting the controls shown in FIGS. 5, 6(A), 6(B) and 6(C). Numeral 51 denotes a telephone line, numeral 52 denotes a modem (modulator/demodulator), numeral 53 denotes a CPU bus, numeral 54 denotes a CPU, numeral 55 denotes a crystal oscillator, numeral 56 denotes a ROM, numeral 57 denotes a RAM, numeral 58 denotes a PPI (programmable peripheral interface), numerals 59 and 60 denote UPI (universal peripheral interface), numeral 61 denotes an NCU (network control unit), numeral 62 denotes a sub-scan driver, numeral 63 denotes a plunger driver, numeral 64 denotes a main scan driver and numeral 65 denotes a thermal head driver.

Those blocks are connected as shown in FIG. 7. When the perforations are to be formed in the record paper 8, a control signal issued from the CPU54 is supplied to the plunger 39 through the CPU bus 53, the UPI59 and the plunger driver 63 to bring the perforating wheel 31 into contact with the record paper 8. When a signal is supplied to the motor 5 through the UPI59 and the main scan driver 64, the head mount 1 which carries the perforating wheel 31 is moved in the main scan direction and the perforating wheel 31 is rotated to form the perforations.

On the other hand, when the record paper 8 is to be fed in the sub-scan direction, the motor 19 is driven by the output of the sub-scan driver 62 so that the rollers 15A and 15B are rotated to feed the record paper 8. The position setting of the perforation line and the feed of the record paper 8 are controlled by the block B2.

What I claim is:

1. A recording apparatus for recording an image on a recording sheet comprising:
   means for transporting the recording sheet along a path;
   means located along a path for recording the image on the recording sheet in response to an image signal;
   perforation means located along the path and having tooth edges for forming perforations in the recording sheet;
   cutting means located downstream of said perforation means with respect to a direction in which said sheet is transported, for cutting said sheet; and
   control means for controlling said perforation means such that perforations are formed at a desired margin between recorded images and such that in response to a decision to end processing, perforations are again formed after the last formed perforations are transported to said cutting means.

2. A recording apparatus according to claim 1, wherein said perforation means includes a perforation wheel.

3. A recording apparatus according to claim 1, wherein said cutting means includes a fixed cutter.

4. A recording apparatus according to claim 1, wherein said decision is made in response to the absence of an image communication start signal from a transmitter end for a predetermined time period.

5. A recording apparatus according to claim 1, wherein said decision is made in response to a process-discontinuation signal from a transmitter end.

* * * * *

UNITED STATES PATENT AND TRADEMARK OFFICE
CERTIFICATE OF CORRECTION

PATENT NO. : 4,604,632

DATED : August 5, 1986

INVENTOR(S) : HIROAKI MATSUMOTO

It is certified that error appears in the above-identified patent and that said Letters Patent is hereby corrected as shown below:

COLUMN 1

Line 54, "shows" should read --show--.

COLUMN 2

Line 11, "shows" should read --show--.

COLUMN 3

Lines 14-15, "side 35A is normally kept in abutment to a side 35A of a" should read --side 35A of a--.

Line 67, "machinning" should read --machining--.

COLUMN 6

Line 14, "32" should read --32 of--.

UNITED STATES PATENT AND TRADEMARK OFFICE
CERTIFICATE OF CORRECTION

PATENT NO.   : 4,604,632

DATED        : August 5, 1986

INVENTOR(S)  : HIROAKI MATSUMOTO

It is certified that error appears in the above-identified patent and that said Letters Patent is hereby corrected as shown below:

COLUMN 8

Line 55, "recorded" should read --recording--.

Signed and Sealed this

Thirty-first Day of March, 1987

Attest:

DONALD J. QUIGG

Attesting Officer

Commissioner of Patents and Trademarks